(12) United States Patent
Fang et al.

(10) Patent No.: US 6,406,030 B1
(45) Date of Patent: *Jun. 18, 2002

(54) O-RING SEAL WITH LUBRICANT ADDITIVES FOR ROCK BIT BEARINGS

(75) Inventors: Zhigang Fang, The Woodlands; Robert Denton, Pearland; Steven W. Peterson, The Woodlands, all of TX (US)

(73) Assignee: Smith International, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/943,867

(22) Filed: Oct. 8, 1997

Related U.S. Application Data

(60) Provisional application No. 60/027,950, filed on Oct. 8, 1996.

(51) Int. Cl.[7] ................................................. F16J 15/16
(52) U.S. Cl. ........................ 277/407; 277/336; 277/944
(58) Field of Search ................................. 277/336, 407, 277/910, 936, 944

(56) References Cited

U.S. PATENT DOCUMENTS

| | | | |
|---|---|---|---|
| 3,867,333 A | * | 2/1975 | Vanderbilt |
| 4,477,608 A | * | 10/1984 | Babler et al. |
| 4,520,879 A | * | 6/1985 | MacElvain |
| 4,763,158 A | * | 8/1988 | Schlueter, Jr. |
| 5,264,270 A | * | 11/1993 | Agrawal ...................... 428/192 |
| 5,323,863 A | * | 6/1994 | Denton ........................ 175/57 |
| 5,364,676 A | * | 11/1994 | Takago et al. ............. 428/35.7 |
| 5,402,858 A | | 4/1995 | Quantz et al. .............. 175/371 |
| 5,444,116 A | * | 8/1995 | Amin et al. ................. 524/495 |
| 5,456,327 A | | 10/1995 | Denton et al. .............. 175/371 |
| 5,667,224 A | * | 9/1997 | Streckert et al. ........ 277/944 X |
| 5,700,341 A | * | 12/1997 | Steelman et al. ........... 156/172 |

* cited by examiner

Primary Examiner—Anthony Knight
(74) Attorney, Agent, or Firm—Christie, Parker & Hale, LLP

(57) ABSTRACT

O-ring seals for rock bit bearings comprise a body formed from an elastomeric material having one or more lubricant additive uniformly distributed throughout to reduce the coefficient of friction and stick slick amplitude at O-ring seal surfaces. The lubricant additives are selected from the group consisting of polytetrafluoroethylene, hexagonal boron nitride, flake graphite, ultra-high molecular weight polyurethane, and mixtures thereof. O-ring seals made from elastomeric compositions of this invention comprise in the range of from about 85 to 99 percent by volume elastomeric material, and in the range of from about 1 to 15 percent by volume of the lubricant additives based on the total volume of the composition.

17 Claims, 2 Drawing Sheets

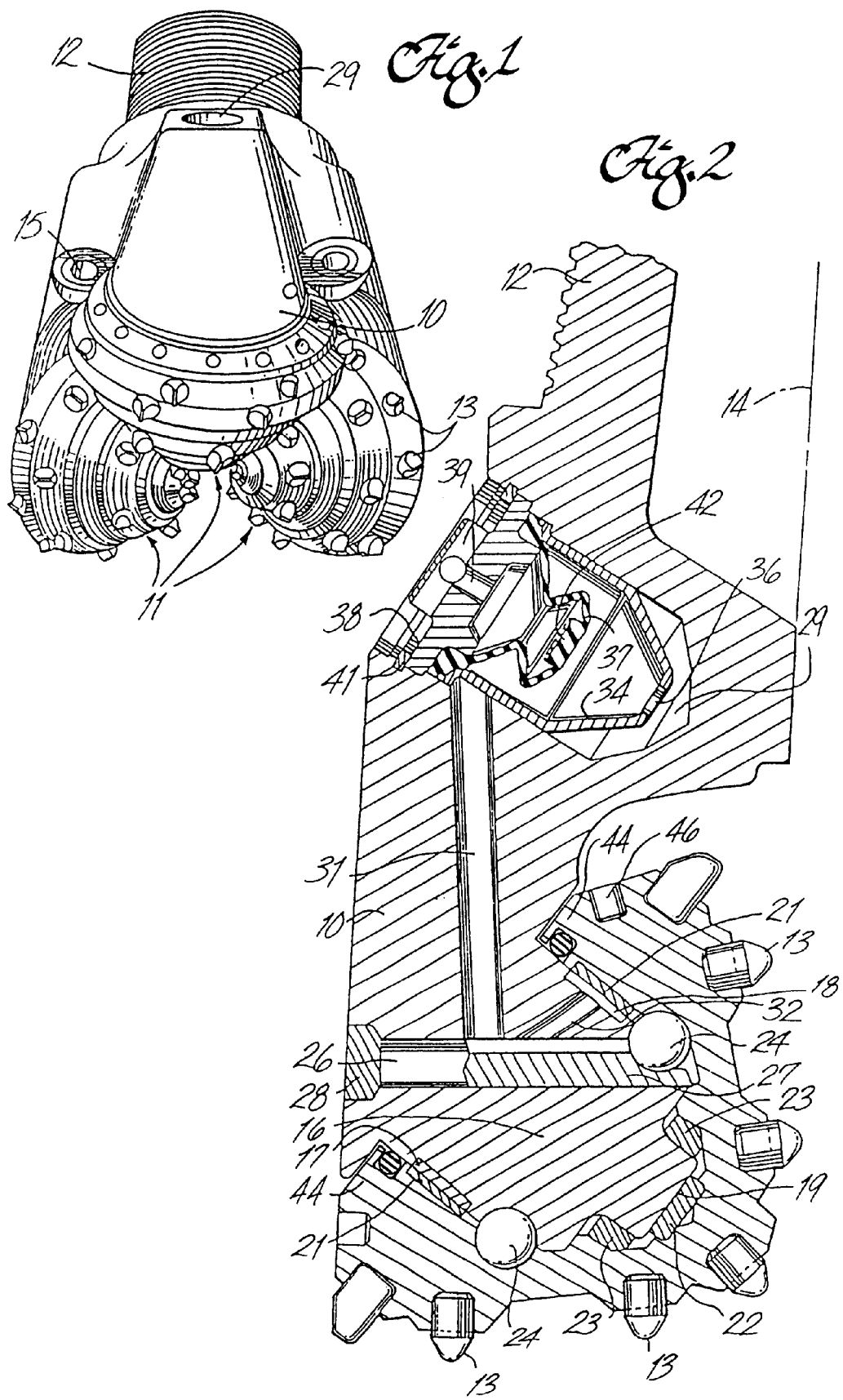

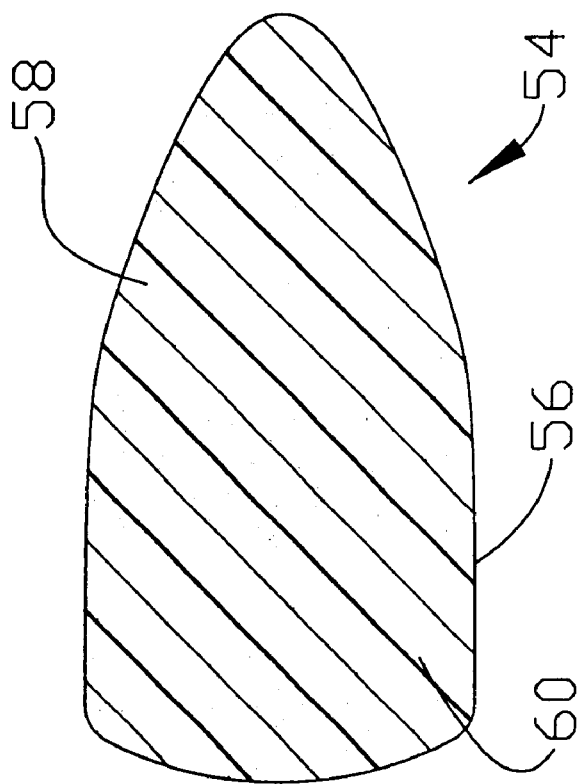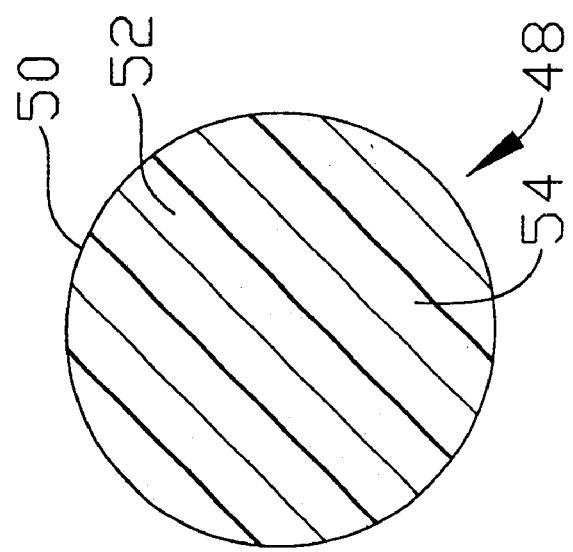

O-RING SEAL WITH LUBRICANT ADDITIVES FOR ROCK BIT BEARINGS

This appln claims benefits of No. 60/027,950 filed Oct. 8, 1996.

FIELD OF THE INVENTION

This invention relates to an O-ring seal for retaining the lubricant around the journal bearings in a rock bit or drill bit for drilling oil wells or the like. More particularly, this invention relates to an O-ring seal comprising one or more lubricant additives that reduce friction, improve wear resistance, reduce abrasion, and reduce stick slip between the O-ring seal and interfacing rock bit surfaces to enhance the service life of the O-ring seal and rock bit.

BACKGROUND OF THE INVENTION

Heavy-duty drill bits or rock bits are employed for drilling wells in subterranean formations for oil, gas, geothermal steam, minerals and the like. Such drill bits have a body connected to a drill string and a plurality, typically three, of hollow cutter cones mounted on the body for drilling rock formations. The cutter cones are mounted on steel journals or pins integral with the bit body at its lower end. In use, the drill string and bit body are rotated in the bore hole, and each cone is caused to rotate on its respective journal as the cone contacts the bottom of the bore hole being drilled. As such a rock bit is used for drilling in hard, tough formations, high pressures and temperatures are encountered.

When a drill bit wears out or fails as a bore hole is being drilled, it is necessary to withdraw the drill string for replacing the bit. The amount of time required to make a round trip for replacing a bit is essentially lost from drilling operations. This time can become a significant portion of the total time for completing a well, particularly as the well depths become great. It is therefore quite desirable to maximize the service life of a drill bit in a rock formation. Prolonging the time of drilling minimizes the time lost in "round tripping" the drill string for replacing the bits. Replacement of a drill bit can be required for a number of reasons, including wearing out or breakage of the structure contacting the rock formation.

One of the consistent problems in drill bits is the inconsistency of service life. Sometimes bits are known to last for long periods, whereas bits which are apparently identical operated under similar conditions may fail within a short lifetime. One cause of erratic service life is failure of the bearings. Bearing failure can often be traced to failure of the seal that retains lubricant in the bearing. Lubricant may be lost if the seal fails, or abrasive particles of rock may work their way into the bearing surfaces, causing excessive wear.

Rock bit O-rings are being called on to perform service in environments which are extremely harsh. Modern bits are being run at exceptionally high surface speeds, sometimes more than 500 feet per minute, with cone speeds averaging in the range of from 200 to 400 revolutions per minute. One face of the O-ring is exposed to abrasive drilling fluid and mud.

The life of the O-ring may be significantly degraded by high temperatures due to friction (as well as elevated temperature in the well bore) and abrasion.

In order to provide a consistently reliable O-ring seal for maintaining the lubricant within rock bits, it is known to make the O-ring seal from a resilient elastomeric composition displaying a desire degree of chemical resistance, heat resistance, and wear resistance. O-ring seals known in the art are constructed from resilient elastomeric materials that, while displaying some degree of chemical, heat, and wear resistance, ultimately limit the service life of the rock bit by wearing away along the surface during use.

Attempts to have been made to improve O-ring properties of wear resistance by adding lubricant additives to the elastomeric composition. U.S. Pat. No. 5,402,858, for example, discloses an O-ring seal formed from an elastomeric material comprising low-friction wear resistant particles distributed therein. The wear resistant particles were selected from the group including copper, bronze, brass, nickel, cobalt, cemented tungsten carbide, and titanium carbide.

It has been discovered that while such example O-ring seal constructions displayed reduced properties of stick slip, they were not completely effective at reducing friction and abrasion between the interfacing O-ring seal and rock bit surface.

It is therefore desirable to provide a consistently reliable O-ring seal for maintaining the lubricant within a rock bit, that has a long useful life, is resistant to crude gasoline and other chemical compositions found within oil wells, has high heat resistance, is highly resistant to abrasion, has a low coefficient of friction against the adjacent seal surfaces to minimize heating and wear, and that will not readily deform under load and allow leakage of the grease from within the bit or drilling mud into the bit.

SUMMARY OF THE INVENTION

There is, therefore, provided in practice of this invention an improved O-ring seal for rock bit bearings comprising a body formed from an elastomeric material having one or more lubricant additive uniformly distributed throughout. The lubricant additives are selected from the group consisting of polytetrafluoroethylene, hexagonal boron nitride, flake graphite, ultra-high molecular weight polyurethane, and mixtures thereof.

O-ring seals made from elastomeric compositions of this invention comprise in the range of from about 85 to 99 percent-by volume elastomeric material, and in the range of from about 1 to 15 percent by volume of the lubricant additives based on the total volume of the composition.

O-ring seals made from elastomeric compositions of this invention have a reduced coefficient of friction, display reduced wear, stick-slip, abrasion, and improved temperature stability when compared to O-ring seals formed from conventional elastomeric materials not having such lubricant additives.

BRIEF DESCRIPTION OF THE DRAWINGS

These and other features and advantages of the present invention will become appreciated as the same becomes better understood with reference to the drawings wherein:

FIG. 1 is a semi-schematic perspective of a rock bit containing an O-ring seal constructed according to the principles of this invention;

FIG. 2 is a partial cross-sectional view of the rock bit of FIG. 1;

FIG. 3 is a cross-sectional view of an O-ring seal, constructed according to principles of this invention, having a symmetric axial cross section; and FIG. 4 is a cross-sectional view of an alternative embodiment of an O-ring seal, constructed according to principles of this invention, having an asymmetric axial cross section.

DETAILED DESCRIPTION

A rock bit employing an O-ring seal constructed according to principles of this invention comprises a body 10 having three cutter cones 11 mounted on its lower end, as shown in FIG. 1. A threaded pin 12 is at the upper end of the body for assembly of the rock bit onto a drill string for drilling oil wells or the like. A plurality of tungsten carbide inserts 13 are pressed into holes in the surfaces of the cutter cones for bearing on the rock formation being drilled. Nozzles 15 in the bit body introduce drilling fluid into the space around the cutter cones for cooling and carrying away formation chips drilled by the bit.

O-ring seals are generally thought of as comprising a cylindrical inside and outside diameter, and a circular cross section. Accordingly, for purposes of reference and clarity, the figures used to describe the principles and embodiments of this invention have been created to illustrate an O-ring seal having a generally circular cross section. However, the principles of this invention are also meant to apply to O-ring seals having non-circular cross sections. Such O-ring seals can be configured having either symmetric or asymmetric non-circular cross sections. It is therefore, to be understood that the principles of this invention may apply to O-rings having a circular or non-circular cross sections.

FIG. 2 is a fragmentary, longitudinal cross-section of the rock bit, extending radially from the rotational axis 14 of the rock bit through one of the three legs on which the cutter cones 11 are mounted. Each leg includes a journal pin extending downwardly and radially, inwardly on the rock bit body. The journal pin includes a cylindrical bearing surface having a hard metal insert 17 on a lower portion of the journal pin. The hard metal insert is typically a cobalt or iron-based alloy welded in place in a groove on the journal leg and having a substantially greater hardness that the steel forming the journal pin and rock bit body.

An open groove 18 is provided on the upper portion of the journal pin. Such a groove may, for example, extend around 60 percent or so of the circumference of the journal pin, and the hard metal insert 17 can extend around the remaining 40 percent or so. The journal pin also has a cylindrical nose 19 at its lower end.

Each cutter cone 11 is in the form of a hollow, generally-conical steel body having cemented tungsten carbide inserts 13 pressed into holes on the external surface. For long life, the inserts may be tipped with a polycrystalline diamond layer. Such tungsten carbide inserts provide the drilling action by engaging a subterranean rock formation as the rock bit is rotated. Some types of bits have hard-faced steel teeth milled on the outside of the cone instead of carbide inserts.

The cavity in the cone contains a cylindrical bearing surface including an aluminum bronze insert 21 deposited in a groove in the steel of the cone or as a floating insert in a groove in the cone. The aluminum bronze insert 21 in the cone engages the hard metal insert 17 on the leg and provides the main bearing surface for the cone on the bit body. A nose button 22 is between the end of the cavity in the cone and the nose 19 and carries the principal thrust loads of the cone on the journal pin. A bushing 23 surrounds the nose and provides additional bearing surface between the cone and journal pin. Other types of bits, particularly for higher rotational speed applications, have roller bearings instead of the journal bearings illustrated herein. It is to be understood that O-ring seals constructed according to principles of this invention may be used with rock bits comprising either roller bearings or conventional journal bearings.

A plurality of bearing balls 24 are fitted into complementary ball races in the cone and on the journal pin. These balls are inserted through a ball passage 26, which extends through the journal pin between the bearing races and the exterior of the rock bit. A cone is first fitted on the journal pin, and then the bearing balls 24 are inserted through the ball passage. The balls carry any thrust loads tending to remove the cone from the journal pin and thereby retain the cone on the journal pin. The balls are retained in the races by a ball retainer 27 inserted through the ball passage 26 after the balls are in place. A plug 28 is, then welded into the end of the ball passage to keep the ball retainer in place. The bearing surfaces between the journal pin and the cone are lubricated by a grease. Preferably, the interior of the rock bit is evacuated, and grease is introduced through a fill passage (not shown). The grease thus fills the regions adjacent the bearing surfaces plus various passages and a grease reservoir, and air is essentially excluded from the interior of the rock bit. The grease reservoir comprises a cavity 29 in the rock bit body, which is connected to the ball passage 26 by a lubricant passage 31. Grease also fills the portion of the ball passage adjacent the ball retainer, the open groove 18 on the upper side of the journal pin and a diagonally extending passage 32 therebetween. Grease is retained in the bearing structure by a resilient seal in the form of an O-ring 44 between the cone and journal pin.

A pressure compensation subassembly is included in the grease reservoir 29. The subassembly comprises a metal cup 34 with an opening 36 at its inner end. A flexible rubber bellows 37 extends into the cup from its outer end. The bellows is held into place by a cap 38 with a vent passage 39. The pressure compensation subassembly is held in the grease reservoir by a snap ring 41.

When the rock bit is filled with grease, the bearings, the groove 18 on the journal pin, passages in the journal pin, the lubrication passage 31, and the grease reservoir on the outside of the bellows 37 are filled with grease. If the volume of grease expands due to heating, for example, the bellows 37 is compressed to provide additional volume in the sealed grease system, thereby preventing accumulation of excessive pressures. High pressure in the grease system can damage the O-ring seal 44 and permit drilling fluid or the like to enter the bearings. Such material is abrasive and can quickly damage the bearings. Conversely, if the grease volume should contract, the bellows can expand to prevent low pressures in the sealed grease system, which could cause flow of abrasive and/or corrosive substances past the O-ring seal.

The bellows has a boss 42 at its inner end which can seat against the cap 38 at one end of the displacement of the bellows for sealing the vent passage 39. The end of the bellows can also seat against the cup 34 at the other end of its stroke, thereby sealing the opening 36. If desired, a pressure relief check valve can also be provided in the grease reservoir for relieving over-pressures in the grease system that could damage the O-ring seal. Even with a pressure compensator, it is believed that occasional differential pressures may exist across the O-ring of up to 150 psi (550 kilopascals). To maintain the desired properties of the O-ring seal at the pressure and temperature conditions that prevail in a rock bit, to inhibit "pumping" of the grease through the O-ring seal, and for a long useful life, it is important that the O-ring seal be resistant to crude gasoline and other chemical compositions found within oil wells, have a high heat and abrasion resistance, have low rubbing friction, and not be readily deformed under the pressure and temperature conditions in a well which could allow leakage of the grease from within the bit or drilling mud into the bit.

Suitable elastomeric materials useful for forming O-ring seal constructions of this invention include those selected from the group of carboxylated elastomers such as carboxylated nitriles, highly saturated nitrile (HSN) elastomers, nitrile-butadiene rubber (HBR), highly saturated nitrile-butadiene rubber (UNBR) and the like. Particularly preferred elastomeric materials are HNBR and HSN. An exemplary HNBR material is set forth in the examples below. Other desirable elastomeric materials include those HSN materials disclosed in U.S. Pat. No. 5,323.863, that is incorporated herein by reference, and a proprietary HSN manufactured by Smith International, Inc., under the product name HSN-8A. It is to be understood that the HNBR material set forth in the example, and the HSN materials described above, are but one example of elastomeric materials useful for making O-ring seals according to this invention, and that other elastomeric materials made from different chemical compounds and/or different amounts of such chemical compounds may also be used.

It is desired that such elastomeric materials have a modulus of elasticity at 100 percent elongation of from about 400 to 2,000 psi (3 to 12 megapascals), a minimum tensile strength of from about 1,000 to 7,000 psi (6 to 42 megapascals), elongation of from 100 to 500 percent, die C tear strength of at least 100 lb/in. (1.8 kilogram/millimeter), durometer hardness Shore A in the range of from about 60 to 95, and a compression set after 70 hours at 100° C. of less than about 18 percent, and preferably less than about 16 percent.

An exemplary elastomeric composition may comprise per 100 parts by weight of elastomer (e.g., HSN, HNBR and the like), furnace black in the range of from 20 to 50 parts by weight, peroxide curing agent in the range of from 7 to 10 parts by weight, zinc oxide or magnesium oxide in the range of from 4 to 7 parts by weight, stearic acid in the range of from 0.5 to 2 parts by weight, and plasticizer up to about 10 parts by weight. O-ring seals constructed according to principles of this invention also include one or more lubricant additives that are distributed uniformly throughout the elastomeric material, and that are selected from the group consisting of polytetrafluoroethylene (PTFE), hBN, flake graphite, ultra-high molecular weight polyurethane (UHMWPE), and mixtures thereof. The lubricant additives are selected to provide an added degree of low friction and wear resistance to the elastomeric component of the O-ring seal material. The lubricant additives are also selected to reduce the amount of stick-slip that occurs between the O-ring seal surface and an adjacent rotating rock bit surface.

Stick-slip refers to a mechanism of failure in a rock bit O-ring seals. As the elastomer of the O-ring seal moves along the metal surface of the leg or cone, the O-ring seal material momentarily sticks to the metal surface. Almost instantly the elastomer then slips relative to the metal. Tills making and breaking of bonds between the elastomer and metal dissipates energy and causes frictional heating. Furthermore, if too strong a bond is formed between the elastomer and metal, some of the elastomer may be removed from the O-ring, thereby degrading the O-ring surface and roughening the rock bit surface. The lubricant additives described above have been selected because of their ability to minimize the amount of sticking between the elastomer and metal without changing the bulk properties of the main body of the O-ring.

Particularly preferred lubricant additives are hBN and flake graphite. hBN is particularly preferred because of its low coefficient of friction, good thermal conductivity, and high temperature stability. hBN also provides excellent properties of high-temperature mold release. A preferred hBN has a particle size in the range of from about 0.1 to 20 micrometers. A particularily preferred hBN is commercially available, for example, from Advanced Ceramic Corp., of Cleveland, Ohio as Grade HCP hBN having an average particle size in the range of from about one to ten micrometers. hBN is a particularly preferred lubricant additive because it provides a superior degree of lubrication when placed in contact with steel without producing harmful side effects, e.g., abrasive, side effects to the journal or cone.

Flake graphite is also particularly preferred because of its low coefficient of friction and low coefficient of thermal expansion, and because of its softness and low abrasion. Flake graphite, rather than other forms of graphite such as artificial graphite, amorphous graphite, and crystalline graphite vein, is selected for use as a lubricant additive for making O-ring seals of this invention because of its morphology of weak interlayer bonds of the crystal that allows for easy slippage of the planes, thereby, giving flake graphite a pronounced softness and increased properties of lubrication not present in such other forms of graphite. Flake graphite is a mined mineral that has plate form and acts as single-crystal graphite.

A preferred flake graphite has in the range of from about 88 to 99 percent by weight carbon, about 1 to 12 percent by weight ash, and may have an average particle size of 20×50 mesh, 30×60 mesh, 50×200 mesh, 80×325 mesh, 325 mesh, or about five micrometers. A particularly preferred flake graphite has carbon content of approximately 96 percent by weight, an ash content of approximately 4 percent by weight, and has an average particle size of 20 approximately 325 mesh.

In addition to their friction reducing properties, it has been discovered that hBN and flake graphite can be used as a partial substitute for carbon black in the elastomeric material to provide strength thereto, to reduce the coefficient of friction of the elastomeric composition, and to reduce the amount of abrasive wear caused to the interfacing rock bit surface by the elastomeric material. The hBN and flake graphite lubricant additives have the unique effect of both increasing the wear resistance and coefficient of friction of the elastomeric material while making the elastomeric material less abrasive against the mating journal surface.

O-ring seal compositions of this invention comprise in the range of from about 85 to 99 percent by volume elastomeric material, and in the range about 1 to 15 percent by volume of the lubricant additive based on the total volume of the seal composition. A seal composition comprising less than about one percent by volume of the lubricant additive would contain an insufficient amount of the lubricant additive to provide a desired reduction in the friction, wear, abrasion, and stick-slip characteristics of the elastomeric material. A seal composition comprising greater than about 15 percent by volume of the lubricant additive would contain an amount of lubricant additive that could interfere with or adversely effect desired mechanical properties of the elastomeric material.

Seal compositions of this invention are prepared by combining the elastomeric seal component with the lubricant additive by conventional solid mixing techniques, such as by mill process and the like, until the lubricant additive are uniformly distributed throughout the elastomeric material. The O-ring seal is formed and cured according to conventional industry practices for forming and curing O-rings seals made from conventional elastomeric materials, e.g., by high temperature mold process. A feature of O-ring seals formed from elastomeric seal compositions of this invention is that the presence of the lubricant additive aids the release of the just-formed O-ring seal from the mold during the high-temperature molding process.

Referring to FIG. 3, an exemplary embodiment of an O-ring seal 48 of this invention comprises a body 50 having a symmetric axial cross section, the body being formed from the elastomeric material 52 and the lubricant additive 54 uniformly distributed throughout. Referring to FIG. 4, an alternative embodiment of an O-ring seal 55 of this invention comprises a body 56 having an asymmetric axial cross section, the body being formed from the elastomeric material 58 and the lubricant additive 60 uniformly distributed throughout.

The completed O-ring seal is placed into position in the rock bit with portions of the seal surface in contact with respective surfaces of the cone and the journal. In an exemplary rotary cone rock bit, the O-ring seal is disposed within the cone and includes a static seal surface that is in contact with the cone, and a dynamic seal surface that is placed adjacent a journal pin. As the cone is rotated about the journal pin, the dynamic seal surface slides over the adjacent journal pin surface, producing friction at the dynamic seal surface. The presence of the lubricant additive in the elastomeric seal composition reduces amount of friction produced at the dynamic seal surface, and reduces the amount of stick-slip by minimizing the occurrence of the "sticking" portion and maximize the "slipping" portion of the stick-slip phenomena. The reduction of stick-slip serves to reduce material loss from the surface of the O-ring seal and, thus extends the service life of the O-ring seal and rock bit.

O-ring seals constructed from elastomeric compositions prepared according to principles of this invention may be better understood with reference to the following examples.

Preparation of Control Elastomeric Material

An elastomeric material was prepared by combining approximately 100 parts by weight HNBR, 1.5 parts by weight antioxidant, 30 parts by weight carbon black, 5 parts by weight zinc oxide, 0.5 parts by weight stearic acid, 10 parts by weight plasticizer, 4 parts by weight vulcanizer, and 10 parts by weight curative agent. A seal was formed from the elastomeric material as a control, and the control was tested stick slip amplitude and average coefficient or friction. The test results are provided in Table 1 below.

EXAMPLE No. 1

Elastomer with hBN Lubricant Additive

An elastomeric seal composition was prepared using the control elastomeric material described above and adding to it approximately 40 parts per weight hBN. The resulting elastomeric seal composition comprised approximately 20 percent by weight hBN (15 percent by volume hBN).

EXAMPLE No. 2

Elastomer with Flake Graphite Lubricant Additive

An elastomeric seal composition was prepared using the control elastomeric material described above and adding to it approximately 25 parts per weight flake graphite. The resulting elastomeric seal composition comprised approximately 14 percent by weight flake graphite (10 percent by volume flake graphite).

TABLE 1

| Test Specimen | Average Coefficient of Friction | Stick Slip Amplitude |
| --- | --- | --- |
| Control (w/o lubricant additive) | 0.007 | 0.0016 |
| Example 1 (20% by wt hBN) | 0.006 | 0.0004 |
| Example 2 (14% by wt flake graphite) | 0.006 | 0.0007 |

The test data presented in Table 1 supports the claim that O-ring seals constructed according to principles of this invention have an average coefficient of friction that is up to about 15 percent lower than that of the elastomeric material alone, and have a stick-slip amplitude that is up to about 75 percent lower than that of the elastomeric material alone. Depending on the particular amount of and type of lubricant additive selected, the coefficient of friction can be up to about 20 percent lower, and the stick-slip amplitude can be up to about 98 percent lower, that of elastomeric materials alone. The combined reduction in the coefficient of friction and stick-slip amplitude occurs without adversely effecting the desired properties of the elastomeric materials, such as modulus, percent elongation, compression set, Shore A hardness and the like, thereby enhancing the service life of the seal.

Although, limited embodiments of O-ring seal compositions for rock bit bearings have been described and illustrated herein. Many modifications and variations will be apparent to those skilled in the art. Accordingly, it is to be understood that within the scope of the appended claims, O-ring seals for rock bit bearings according to principles of this invention may be embodied other than as specifically described herein.

What is claimed is:

1. A journal seal for use with a rotary cone rock bit comprising:
    a flexible and resilient seal body formed from an elastomeric material selected from materials consisting of highly-saturated nitrile elastomers, nitrile-butadiene rubber, highly-saturated nitrile-butadiene rubber, and mixtures thereof; and
    a seal dynamic surface along one surface area of the seal body, and a seal static surface along another surface area of the seal body each formed from the elastomeric material, wherein the elastomeric material further comprises a lubricant additive to reduce friction and stick slip at the seal dynamic surface that is formed from hexagonal boron nitride;
    wherein the hexagonal boron nitride has an average particle size in the range of from about 0.1 to 20 micrometers.

2. The seal as recited in claim 1 comprising in the range of from 1 to 15 percent by volume lubricant additive based on the total volume of the combined elastomeric material and lubricant additive.

3. The seal as recited in claim 1 wherein the lubricant additive is disposed uniformly throughout the elastomeric material forming the seal body, and dynamic and static sealing surfaces.

4. A journal seal for use with a rotary cone rock bit comprising:
    a flexible and resilient seal body formed from an elastomeric material selected from materials consisting of highly-saturated nitrile elastomers, nitrile-butadiene rubber, highly-saturated nitrile-butadiene rubber, and mixtures thereof; and a seal dynamic surface along one surface area of the seal body, and a seal static surface along another surface area of the seal body each formed from the elastomeric material, wherein the elastomeric material further comprises a lubricant additive to reduce friction and stick slip at the seal dynamic surface formed from flake graphite;

wherein the flake graphite has an average particle size of about five micrometers.

5. The seal as recited in claim 4 wherein the flake graphite comprises in the range of from about 88 to 99 percent by weight carbon, and in the range of from about 1 to 12 percent by weight ash.

6. The seal as recited in claim 4 comprising in the range of from 1 to 15 percent by volume lubricant additive based on the total volume of the combined elastomeric material and lubricant additive.

7. The seal as recited in claim 4 wherein the lubricant additive is disposed uniformly throughout the elastomeric material forming the seal body, and dynamic and static sealing surfaces.

8. A rotary cone rock bit for drilling subterranean formations comprising;
   a bit body including a plurality of journal pins each extending from a leg portion of the bit and having a bearing surface;
   a cutter cone rotatably mounted on each journal pin and including a bearing surface;
   a pressure-compensated grease reservoir in communication with such bearing surfaces;
   a grease in the grease reservoir and adjacent the bearing surfaces; and
   a dynamic annular seal for retaining the grease between the bearing surfaces comprising:
      a body portion and a surface portion both being flexible and resilient, and both being formed from an elastomeric composition selected from materials consisting of highly-saturated nitrile elastomers, nitrile-butadiene rubber, highly-saturated nitrile-butadiene rubber, and mixtures thereof, wherein the elastomeric composition additionally comprises a lubricant additive formed from flake graphite and wherein the surface portion engages a journal pin and cone;
   wherein the flake graphite has an average particle size of about five micrometers.

9. The rock bit as recited in claim 8 wherein the annular seal comprises in the range of from 1 to 15 percent by volume lubricant additive based on the total volume of the elastomeric composition and lubricant additive.

10. The rock bit as recited in claim 8 wherein the lubricant additive is distributed uniformly throughout the elastomeric composition.

11. The rock bit as recited in claim 8 wherein the flake graphite comprises in the range of from about 88 to 99 percent by weight carbon, and in the range of from about 1 to 12 percent by weight ash.

12. A rotary cone rock bit for drilling subterranean formations comprising;
   a bit body including a plurality of journal pins each extending from a leg portion of the bit and having a bearing surface;
   a cutter cone rotatably mounted on each journal pin and including a bearing surface;
   a pressure-compensated grease reservoir in communication with such bearing surfaces;
   a grease in the grease reservoir and adjacent the bearing surfaces; and
   a dynamic annular seal for retaining the grease between the bearing surfaces comprising:
      a body portion and a surface portion both being flexible and resilient, and both being formed from an elastomeric composition selected from materials consisting of highly-saturated nitrile elastomers, nitrile-butadiene rubber, highly-saturated nitrile-butadiene rubber, and mixtures thereof, wherein the elastomeric composition additionally comprises a lubricant additive formed from hexagonal boron nitride having an average particle size in the range of from about 0.1 to 20 micrometers, and wherein the surface portion engages a journal pin and cone.

13. The rock bit as recited in claim 12 wherein the annular seal comprises in the range of from 1 to 15 percent by volume lubricant additive based on the total volume of the elastomeric composition and lubricant additive.

14. The rock bit as recited in claim 12 wherein the lubricant additive is distributed uniformly throughout the elastomeric composition.

15. A rotary cone rock bit for drilling subterranean formations comprising;
   a bit body including a plurality of journal pins each extending from a leg portion of the bit and having a bearing surface;
   a cutter cone rotatably mounted on each journal pin and including a bearing surface;
   a pressure-compensated grease reservoir in communication with such bearing surfaces;
   a grease in the grease reservoir and adjacent the bearing surfaces; and
   a dynamic O-ring seal for retaining the grease between the bearing surfaces comprising:
      a resilient and flexible body having a static sealing surface along a first body portion and a dynamic sealing surface along a second body portion, wherein the body and static and dynamic sealing surfaces are formed from a resilient elastomeric composition comprising materials consisting of highly-saturated nitrile elastomers, nitrile-butadiene rubber, highly-saturated nitrile-butadiene rubber, and mixtures thereof, the elastomeric composition further comprising a lubricant additive uniformly distributed therethrough that is made of flake graphite having an average particle size of about five micrometers, and wherein the elastomeric composition comprises in the range of from 1 to 15 percent by volume lubricant additive based on the total volume of the composition.

16. The rock bit as recited in claim 15 wherein the flake graphite comprises in the range of from about 88 to 99 percent by weight carbon, and in the range of from about 1 to 12 percent by weight ash.

17. A rotary cone rock bit for drilling subterranean formations comprising;
   a bit body including a plurality of journal pins each extending from a leg portion of the bit and having a bearing surface;
   a cutter cone rotatably mounted on each journal pin and including a bearing surface;

a pressure-compensated grease reservoir in communication with such bearing surfaces;

a grease in the grease reservoir and adjacent the bearing surfaces; and a dynamic O-ring seal for retaining the grease between the bearing surfaces comprising:

a resilient and flexible body having a static sealing surface along a first body portion and a dynamic sealing surface along a second body portion, wherein the body and static and dynamic sealing surfaces are formed from a resilient elastomeric composition comprising materials consisting of highly-saturated nitrile elastomers, nitrile-butadiene rubber, highly-saturated nitrile-butadiene rubber, and mixtures thereof, the elastomeric composition further comprising a lubricant additive uniformly distributed therethrough, wherein the lubricant additive is hexagonal boron nitride having an average particle size in the range of from about 0.1 to 20 micrometers, and wherein the elastomeric composition comprises in the range of from 1 to 15 percent by volume lubricant additive based on the total volume of the composition.

* * * * *